Figure 1:
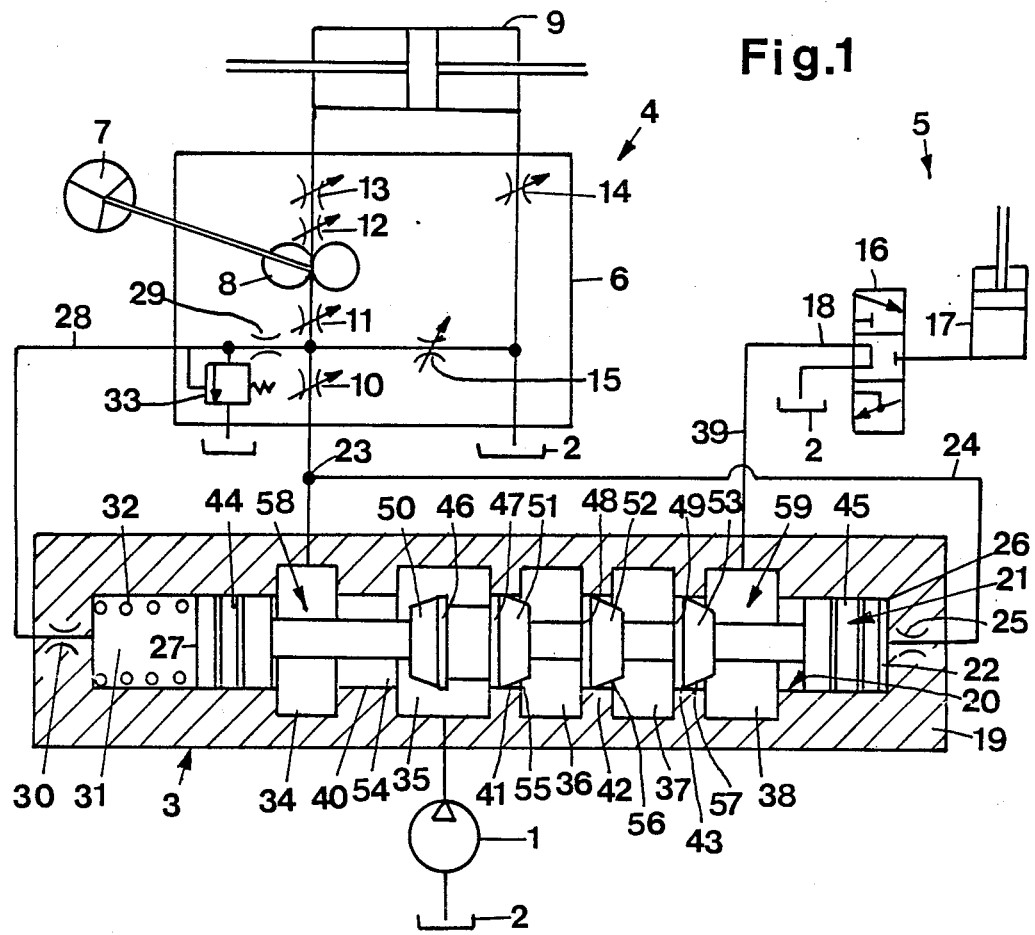

United States Patent [19]

Karlberg

[11] Patent Number: 4,858,515
[45] Date of Patent: Aug. 22, 1989

[54] PRIORITY VALVE FOR HYDRAULIC INSTALLATIONS

[75] Inventor: Niels G. Karlberg, Nordborg, Denmark

[73] Assignee: Danfoss A/S, Nordborg, Denmark

[21] Appl. No.: 798,990

[22] Filed: Nov. 18, 1985

Related U.S. Application Data

[63] Continuation of Ser. No. 543,865, Oct. 20, 1983, abandoned.

[51] Int. Cl.$^4$ .............................................. G05D 11/03
[52] U.S. Cl. ........................................ 91/516; 137/101; 137/117; 251/121
[58] Field of Search ................... 137/101, 117, 614.11, 137/116, 118, 116.5; 251/121, 122, 127; 60/422; 91/514, 516 X

[56] References Cited

U.S. PATENT DOCUMENTS

| | | | |
|---|---|---|---|
| 3,424,057 | 1/1969 | Schweizer | 137/116 X |
| 3,715,098 | 2/1973 | Baumann | 251/121 |
| 3,730,479 | 5/1973 | Baumann | 251/121 |
| 3,817,266 | 6/1974 | Dymond | 137/116 |
| 3,820,756 | 6/1974 | Meyer | 251/127 X |
| 4,192,337 | 3/1980 | Alderson | 137/101 |

FOREIGN PATENT DOCUMENTS 2808999 9/1979 Fed. Rep. of Germany ...... 251/122

Primary Examiner—Stephen M. Hepperle
Attorney, Agent, or Firm—Wayne B. Easton

[57] ABSTRACT

The invention relates to a priority valve for a hydraulic installation having a main circuit and an auxiliary circuit. The priority valve has a slide member which primarily has a controlled throttle for dividing the supply fluid between the main and auxiliary circuits in accordance with the priority demands of the main circuit. The priority valve has a flow path leading to the auxiliary circuit which has throttle elements in series which provide pressure drops in steps to minimize cavitation when there is a rapid flow of fluid in the auxiliary circuit.

1 Claim, 1 Drawing Sheet

U.S. Patent  Aug. 22, 1989  4,858,515

PRIORITY VALVE FOR HYDRAULIC INSTALLATIONS

This application is a continuation of application Ser. No. 543,865, filed 10/20/83, now abandoned.

The invention relates to a priority valve for hydraulic installations having a main circuit and an auxiliary circuit, comprising a bore with annular grooves and a slide therein that has collars and, depending on the demand for pressure fluid by the main circuit, adjusts, in opposite senses, throttles in a first throttle path leading from the pump to the main circuit and in a second throttle path leading from the pump to the auxiliary circuit such that the excess amount of pressure fluid is always fed to the auxiliary circuit.

In a known priority valve of this kind (DE-PS 27 38 463), the slide of the priority valve is adjusted depending on the pressure drop at a diaphragm of the main circuit. The slide comprises two collar of which the end faces form, in conjunction with the end faces of two annular grooves, a respective throttle of which the cross-section changes oppositely depending on the slide position. A common pump feeds a constant amount of a pressure fluid per unit time. This is divided into the amount required by the main circuit and the excess quantity which is fed to the auxiliary circuit. The latter comprises a control valve which, in the neutral position, provides a direct connection to the container. It has been found that disturbing noise sometimes occurs in such a priority valve.

To reduce the noise caused by flow cavitation, it is also known (periodical 'Konstruktion', 31, 1979, pages 461 to 466) to connect a plurality of synchronously adjustable throttle resistors behind one another and allow the individual pressure stages of the series circuit to consist of a plurality of parallel throttle resistors. In particular, to form the individual throttle resistors one can form triangular sections in a sleeve which surrounds the slide and which also contains the passages connecting the individual stages. In this case, the individual part streams are severely deviated.

The invention is based on the problem of providing a priority valve of the aforementioned kind which operates with little noise.

This problem is solved according to the invention in that at least two throttles are provided in series in the second throttle path and are formed by throttle passages which are variable during slide motion and disposed between at least two adjacent collars and a respective bore section adjoining an annular groove.

This construction is based on the discovery that the only intermittently occurring noise is practically exclusively caused by the flow conditions in the second throttle path.

It therefore suffices to take measures for sound damping only in the second thorttle path. The series connection of a plurality of throttles results in a step-wise reduction of the pressure, whereby cavitational effects and consequently the formation of noise are avoided. By reason of using variable throttle passages in which the variable passage length also influences the throttling resistance, it is possible to achieve a desired step-wise reduction in pressure independently of the amount of excess quantity flowing to the auxiliary circuit.

With particular advantage, the cross-section of the passage-shaped throttles changes in the flow direction. A gradual increase is recommended. However, a gradual decrease is also possible. This provides gradual velocity approximations.

In a preferred embodiment, the throttles are bounded by a conical face formed on the collar and a cylindrical bore section. The throttle passages thus formed are particularly simple to produce. Since the flow passes through an annular throttle passage and subsequently enters a wider annular throttle passage, deviation losses are low; the pressure reduction takes place almost completely in these throttle passages. Another advantage can be seen in the fact that the pressure fluid makes contact with a comparatively large wall surface of the throttle passage and, by reason of the wall friction and friction in the thin fluid film, impermissible velocity increases are avoided. The cone angle between the conical face and the slide axis should be small so that the throttle passage will have an adequate throttle effect over its entire length. Thus, the cone angle will generally be less than 10°. However, it can be larger for higher flow quantities.

It is also advisable for the cone angle of each subsequent throttle to be larger than for the preceding throttle. The throttle resistance is therefore lower for the subsequent throttle, as is desirable for a silent reduction in pressure. By using the different angles, one ensures that the same area conditions are maintained during the entire control of the priority valve so that a high stability is produced.

In particular, the cone angles can differ by about 2°.

In a preferred embodiment, three throttles are connected in series. This gives an optimum reduction in noise without excessive constructional expense.

The axial length of the conical faces should be such that there is no overlap with the associated bore section in the limiting position. In this limiting position, the pressure fluid can then flow to the auxiliary circuit practically without throttling losses.

The spacing between successive throttle passage starts should be considerably less than the collar diameter. The pressure fluid can therefore flow direct from one throttle to the next without requiring a space-consuming intermediate chamber. A space can be found empirically at which the noise is a minimum.

In particular, the spacing can be about ⅔ of the collar diameter.

When there are more than two throttles, the spacings between successive throttle passage starts should be equal. One then obtains the same optimum conditions in all intermediate spaces.

In a further embodiment, the throttle in the first throttle path can also be bounded by a conical face on a collar and a cylindrical bore section. To open the first throttle path fully, one requires a comparatively large axial adjustment of the slide. This, in turn, is of interest for forming comparatively long throttle passages in the second throttle path.

It is particularly favourable if a sleeve contains the bore with all annular grooves and connecting passages. Such a sleeve, which can then be inserted in a valve housing, is easier to machine than the valve housing.

Figure 2:
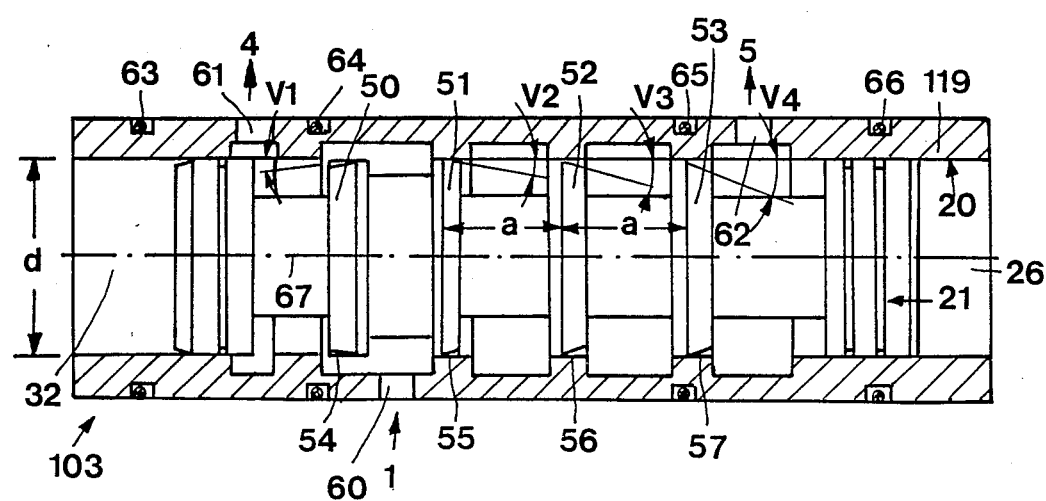

Preferred examples of the invention will now be described in more detail with reference to the drawing, wherein:

FIG. 1 is a diagrammatic longitudinal section of a priority valve according to the invention in conjunction with a hydraulic installation, and FIG. 2 shows a modified embodiment of the priority valve.

In FIG. 1, a pump 1 feeds a constant amount of pressure fluid from a container 2 through a priority valve 3 selectively to a main circuit 4 and/or to an auxiliary circuit 5. The main circuit 4 comprises a control device 6 through which, on actuating a manual steering wheel 7, pressure fluid is fed by way of a metering motor 8 to a steering motor 9 and back to the container 2. Depending on adjustment of the wheel 7 and actuation of the metering motor 8, throttles 10, 11, 12, 13 and 14 are adjusted. These together form a valve arrangement resulting in a directional valve for the steering motor 9 and a distributing valve for the metering motor 8. A throttle 15 is adjusted in the opposite sense and, in the neutral position, connects the point between the throttles 10 and 11 to the tank 2. The auxiliary circuit 5 comprises a control valve 16 and a piston-cylinder unit 17. In its neutral position, the control valve 16 locks the piston space of cylinder 17 and connects its input 18 to the container 2.

The priority valve 3 comprises a housing 19 with a bore 20 in which a slide 21 is axially displaceable. One end face 22 is under the pressure obtaining at the outlet 23 of the priority valve. This outlet is connected by a conduit 24 and a throttle 25 to a pressure chamber 26. The other end face 27 is subjected to the pressure at the point between the throttles 10 and 11. This point is connected to a pressure chamber 31 by way of a conduit 28 with a first throttle 29 and a second throttle 30. The end face 27 is additionally subjected to a spring 32. A pilot valve 33 opens to the container when a predetermined pressure is exceeded in conduit 28, particularly when the steering motor 9 has reached its limiting position. In the neutral position, pressure chamber 31 is connected to the container 2 by way of the thorttles 30, 29 and 15.

The bore 20 comprises a first annular groove 34 connected to the main circuit oulet 23, a second annular groove 35 connected to the pump 1, third and fourth annular grooves 36 and 37 as well as a fifth annular groove 38 connected to an auxiliary circuit outlet 39. Bore sections 40, 41, 42 and 43 remain therebetween. In addition to the two piston-like ends 44 and 45, the slide 21 has four collars 46, 47, 48 and 49. The collar has a conical face 50 converging to the left, and the collars 47, 48 and 49 have conical faces 51, 52 and 53 converging to the right. Consequently, four passage-shaped throttles are formed, namely a throttle 54 between the cylindrical bore section 40 and conical face 50, a throttle 55 between the cylindrical bore section 41 and conical face 51, a throttle 56 between the cylindrical bore section 42 and conical face 52, and a throttle 57 between the cylindrical bore section 43 and conical face 53. Throttle 54 is disposed in a throttle path 58 between pump 1 and main circuit 4. The three throttles 55, 56 and 57 are disposed in a second throttle path 59 between pump 1 and auxiliary circuit 5.

If the pump 1 is in operation and main circuit 4 is switched on, slide 21 is displaced to the left under the influence of the pressure at the outlet 23 acting on end face 22. The entire amount of pressure fluid from the pump is fed through the second throttle path 59 and back to the container 2 by way of the control valve 16 of auxiliary circuit 5 that is in its neutral position. The pressure obtaining in the system is low. When pressure fluid is demanded by the main circuit 4 by adjusting the hand wheel 7, opening of the throttle 10 creates a pressure drop at it. The pressure at point 28 acts on the end face 27. Slide 21 assumes a position of equilibrium in which part of the pressure fluid flows through the first throttle path 58 to the main circuit 4 and the excess amount through the second throttle path 59 to the auxiliary circuit 5. The pressure obtaining in the system depends on the load on the operating motor 9. Since the pump 1 delivers a constant amount per unit time, the pressure of the system depends on the external load. This can cause temporary pressures above 100 bar. Since the outlet 39 is almost at container pressure, the excess quantity in the second throttle path 59 must suffer a corresponding pressure drop. In known priority valves, this was impossible without cavitation effects and noise. However, by connecting a plurality of throttles 55, 56, 57 behind each other, throttling is silent.

In the FIG. 2 embodiment, the housing 19 is merely replaced by a sleeve 119 which, in turn, can be inserted in a valve housing, the connection to pump 1 taking place by way of a bore 60, to the main circuit 4 by way of a bore 61 and to the auxiliary circuit 5 by way of a bore 62, or by way of a set of such bores. The individual connecting zones are sealed from each other and from the pressure chambers 26 and 32 by annular seals 63, 64, 65 and 66. In addition, the cone angles V1, V2, V3 and V4 between the conical faces 50, 51, 52 and 53, respectively, and the slide axis 67 are illustrated. The spacing a between successive starts of throttle passages 55, 56 and 56, 57 is equal and less than the diameter d of slide 21.

In a preferred example, the numerical values were as follows:
Diameter d=16 mm
Spacing a=10.3 mm
Cone angle V1=8°
Cone angle V2=4°
Cone angle V3=6°
Cone angle V4=8°.

With these parameters, a pressure drop in the ratio 3:1 was achieved at the individual throttle passages. Thus, a pressure of 135 bar in annular groove 35 could be reduced without noise to 45 bar in annular groove 36, further to 15 bar in annular groove 37 and still further to 5 bar in annular groove 38. To maintain the pressure at the outlet 39 at 5 bar presents no difficulties by appropriately designing the control valve 16. Correspondingly lower pressure values at the outlet 39 apply in the case of lower pressure values in the annular groove 35.

I claim:

1. A hydraulic system comprising a priority valve having a casing with an inlet port and first and second outlet ports, said casing having a bore having fluid communication with said ports and defining main and auxiliary circuit passages respectively between said inlet port and said first and second outlet ports, a pump connected to said inlet port for supplying pressurized fluid to said circuits, a slide in said bore having throttle elements cooperable with said bore to form throttles, said slide being movable in opposite directions to form main and auxiliary throttling paths between said inlet port and said first and second outlet ports respectively, said throttle elements forming only one throttle in said main throttling path and at least two throttles in series in said auxiliary throttling path to minimize cavitation in said auxiliary throttling path, fluid return tank means, a closed center type steering control device connected to said first valve outlet port and having internal throttle means between said first valve outlet port and said fluid return tank means, and an open center type auxiliary device connected to said second outlet port having an inoperative mode wherein said second valve outlet port is connected directly to said fluid return tank means.

* * * * *